United States Patent
El Sayed

(10) Patent No.: US 7,355,438 B2
(45) Date of Patent: Apr. 8, 2008

(54) ELECTRONIC CIRCUIT

(75) Inventor: Hassan El Sayed, Lancashire (GB)

(73) Assignee: Moore Industries-International, Inc., North Hills, CA (US)

( * ) Notice: Subject to any disclaimer, the term of this patent is extended or adjusted under 35 U.S.C. 154(b) by 0 days.

(21) Appl. No.: 10/573,447

(22) PCT Filed: Sep. 24, 2004

(86) PCT No.: PCT/GB2004/004072

§ 371 (c)(1),
(2), (4) Date: Mar. 24, 2006

(87) PCT Pub. No.: WO2005/032060

PCT Pub. Date: Apr. 7, 2005

(65) Prior Publication Data

US 2007/0103166 A1   May 10, 2007

(30) Foreign Application Priority Data

Sep. 26, 2003  (GB) ................ 0322591.9
Jun. 1, 2004   (GB) ................ 0412081.2

(51) Int. Cl.
    *H03K 17/16* (2006.01)
(52) U.S. Cl. .................. 326/30; 710/100; 710/300
(58) Field of Classification Search ............ 710/100, 710/313; 326/30
    See application file for complete search history.

(56) References Cited

U.S. PATENT DOCUMENTS

| 4,710,949 | A |   | 12/1987 | Ahuja ................. 379/26 |
|-----------|---|---|---------|-------------------------------|
| 5,434,516 | A | * | 7/1995  | Kosco ................. 326/30 |
| 5,583,448 | A | * | 12/1996 | Corder et al. .......... 326/30 |
| 5,706,447 | A | * | 1/1998  | Vivio .................. 362/30 |
| 5,920,266 | A |   | 7/1999  | Allgood et al. ...... 340/825.05 |
| 6,029,216 | A | * | 2/2000  | Hoglund et al. ........ 710/100 |
| 6,061,806 | A | * | 5/2000  | Caldwell et al. .......... 714/3 |
| 6,151,649 | A |   | 11/2000 | Liong et al. ........... 710/126 |
| 6,378,025 | B1| * | 4/2002  | Getty ................ 710/300 |

FOREIGN PATENT DOCUMENTS

| EP | 1 069 733   | 1/2001 |
|----|-------------|--------|
| WO | WO 01/72005 | 9/2001 |

* cited by examiner

*Primary Examiner*—Vibol Tan
(74) *Attorney, Agent, or Firm*—Synnestvedt & Lechner LLP

(57) ABSTRACT

An electronic circuit for terminating a plurality of conductors at a node of a network, including means to detect current flowing through one of the conductors and means to switch between a continuing circuit, whereby continuity of the network is maintained, on detecting current above a first predetermined threshold, and a terminating circuit, whereby the network is terminated with an appropriate terminating circuit, upon detection of current at, or below, a second predetermined threshold.

10 Claims, 3 Drawing Sheets

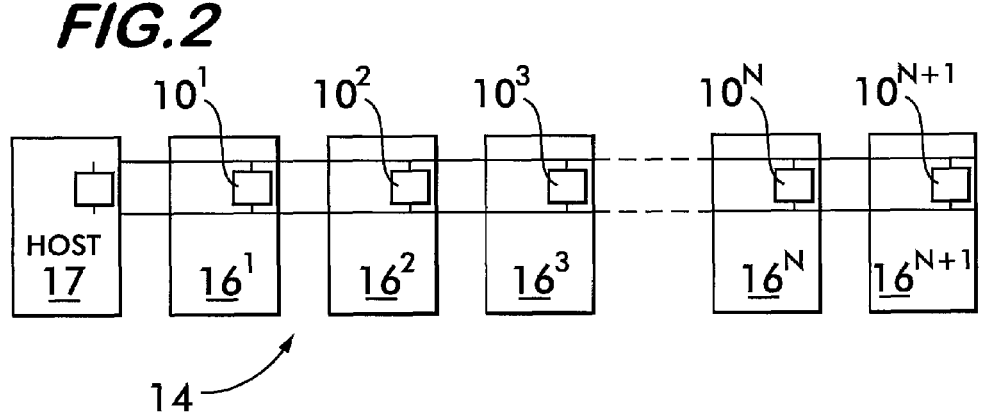
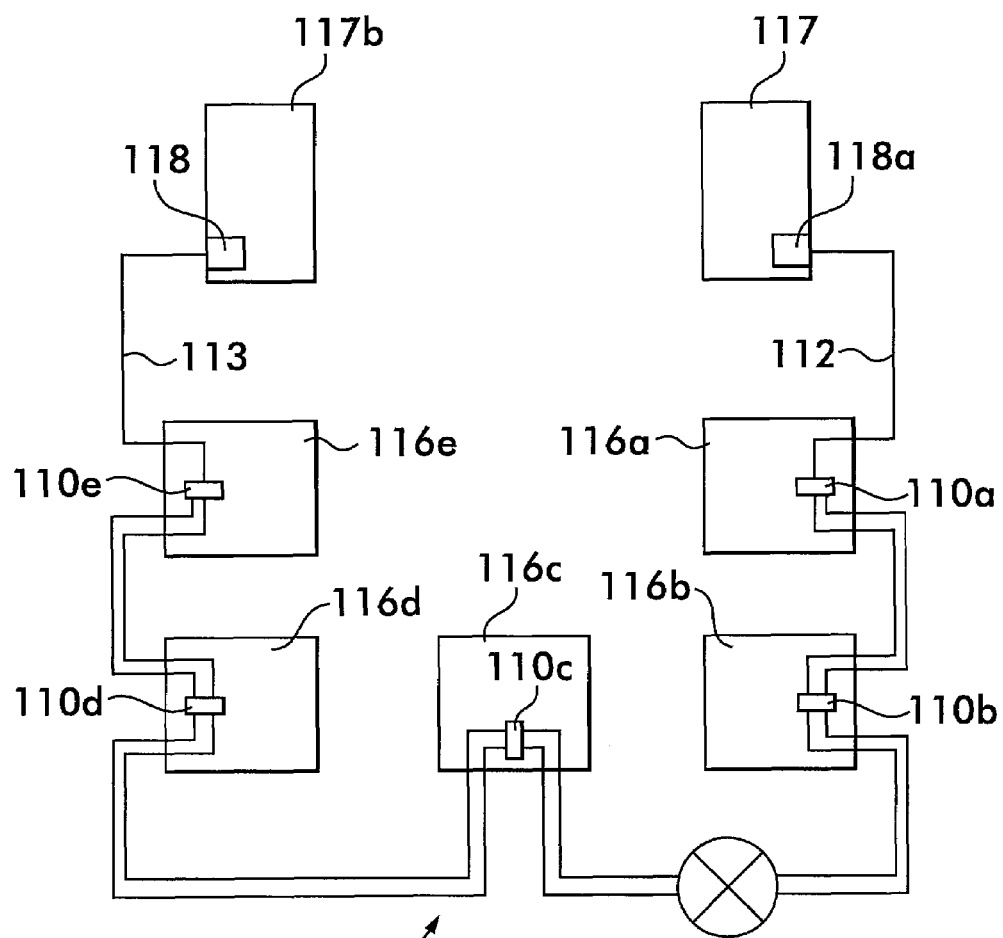

ELECTRONIC CIRCUIT

CROSS REFERENCE TO RELATED APPLICATION

This application is a national stage under 35 USC 371 of international application PCT/GB2004/004072 filed Sep. 24, 2004, which claims priority to UK application GB 0412081.2 filed Jun. 1, 2004, which claims priority to UK application GB 0322591.9 filed Sep. 26, 2003.

FIELD OF THE INVENTION

The present invention relates to electronic circuits and particularly electronic circuits suitable for terminating a transmission path or channel, such as a communication network, for example, a transmission bus network or daisy chain system.

BACKGROUND OF THE INVENTION

For the benefit of clarity the present invention will be described in relation to bus networks. However, the reader will appreciate that the present invention is equally applicable to other network systems such as, for example, daisy chain systems.

A bus network is a plurality of conductors, which serve as a common connection for a group of devices. Although transmission bus networks may comprise any number of conductors, for simplicity the present invention will be described in relation to a two-conductor bus network. However, the reader will appreciate that the invention is equally applicable to networks having more than two conductors.

In order to substantially mitigate, or limit, errors in signals being transmitted, maintenance of the integrity of the transmitted signal and minimising propagation delays and power consumption are important considerations in the engineering of transmission bus networks.

These considerations are substantially addressed by terminating the network with a terminating circuit having appropriate matching impedance. It is normal practice to terminate the network at both ends, that is, at the host and at the last node. This is generally carried out by manual selection and installation of the termination circuit, which typically comprises a terminating resistor in series with a terminating capacitor. A typical network will have multidrop connections at nodes, which are interfaced to local devices.

A disadvantage of known networks of this type is that, upon occurrence of a fault in the network system such as, for example, an open circuit, the signal integrity is lost. Furthermore, such faults are usually difficult to locate within a network and, in such a state, the network is difficult to maintain in a stable condition. This results in considerable amounts of time being spent locating and fixing the fault and maintaining communication between the host and the nodes in the network until the fault is fixed, which is undesirable.

Also, the signal integrity is dependent on the engineer ensuring terminating circuits are specified and fitted correctly and that none of the nodes upstream of the end node are fitted with terminating circuits. Furthermore, if a change or modification is carried out to the network it is necessary for the engineer to check the impedance characteristics of the whole network system. Again, this is undesirably time consuming and expensive.

SUMMARY AND OBJECTS OF THE INVENTION

An object of the present invention is to provide an electronic circuit capable of maintaining the integrity of transmitted signals by terminating the network at a node thereof.

A further object of the present invention is to provide a node comprising such an electronic circuit.

A further object of the present invention is to provide a network comprising a plurality of such circuits.

The present invention provides an electronic circuit, capable of terminating a plurality of conductors at, or near, a node on a network, comprising detecting means, operable to detect current in at least one of the plurality of conductors, and switching means operable to switch the circuit between being a continuing circuit, upon the detecting means detecting a current greater than a first predetermined threshold, and a being terminating circuit, upon the detecting means detecting current at, or less than, a second predetermined threshold.

The terminating circuit advantageously comprises impedance matching means. The impedance matching means may comprise a terminating resistor connected in series with a terminating capacitor.

The terminating circuit is preferably connected between the at least one of the plurality of conductors and the, or each, of the other conductors.

The network may be an active network and the node may be the end node of that active network.

The first threshold may be greater than the second threshold.

The detecting means preferably comprises a sensing resistor, connected in series with the at least one of the plurality of conductors, and means for detecting voltage across the sensing resistor. The means for detecting voltage is preferably a differential amplifier.

The switching means preferably comprises a transistor wherein the base terminal thereof is connected to an output of the detecting means. The collector terminal of the transistor is preferably connected to the impedance matching means and the emitter terminal is preferably connected to the, or each, of the other conductors.

The present invention also provides for a network node comprising an electronic circuit as herein defined in the preceding six paragraphs.

The present invention also provides a network comprising at least one electronic circuit as herein defined in the preceding six paragraphs.

BRIEF DESCRIPTION OF THE DRAWINGS

The present invention will now be described by way of example, with reference to the following drawings, in which:

FIG. 2 is a schematic drawing of a first embodiment of a network comprising the electronic circuit of FIG. 1;

FIG. 3 is a schematic drawing of second embodiment of a network comprising the electronic circuit of FIG. 1; and, FIG. 4 is a schematic drawing of the network of FIG. 3, including checking means.

DETAILED DESCRIPTION OF THE EMBODIMENTS

Figure 1:
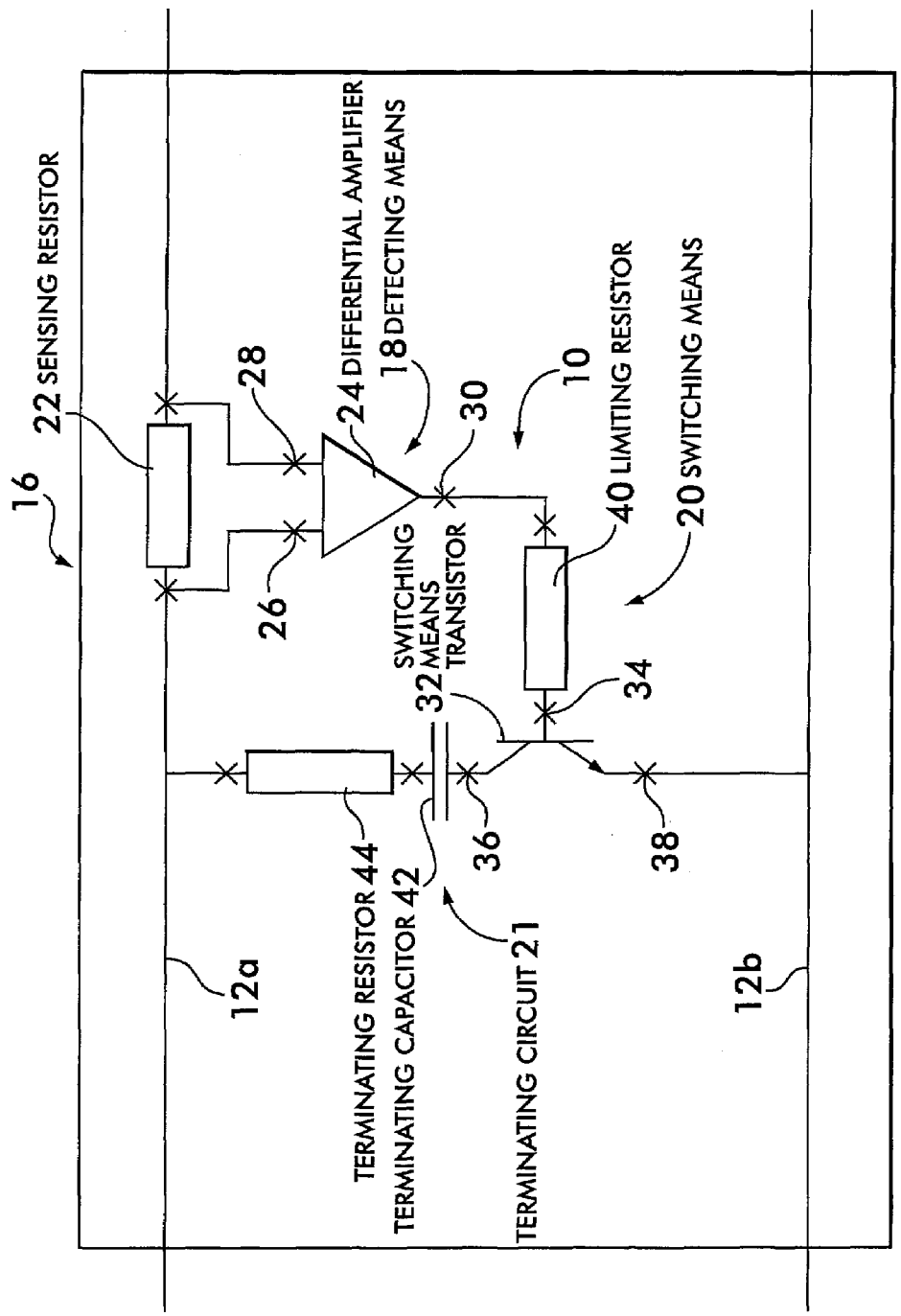
FIG. 1 is a schematic diagram of an electronic circuit according to the present invention.

Referring to FIGS. 1 and 2, an electronic circuit 10, suitable for terminating a two-conductor 12a and b network system 14 at, or near, a node 16 disposed thereon, comprises detecting means 18, switching means 20 and a terminating circuit 21. The two-conductor network system may be, for example, a two-wire transmission bus system.

The detecting means comprises a sensing resistor 22, connected in series with the first conductor 12a, and means to detect voltage across the sensing resistor 22 in the form of a differential amplifier 24. The differential amplifier 24 has first and second inputs, 26 and 28, and an output 30. The first and second inputs, 26 and 28, are connected to the first conductor 12a, across the sensing resistor 22.

The switching means 20 comprises a transistor 32 having a base terminal 34, collector terminal 36 and emitter terminal 38. FIG. 1 shows an NPN bipolar resistor. However, it will be appreciated that other types of bipolar transistor, such as PNP, or field effect transistors, such as MOSFET, are equally applicable to working the invention. The switching means further comprises a limiting resistor 40.

The terminating circuit 21 comprises a terminating capacitor 42 connected in series with a terminating resistor 44, one end of the terminating circuit being connected to the first conductor 12a and the other end being connected to the second conductor 12b by way of the switching means 20.

The first and second inputs, 26 and 28, of the differential amplifier 24 are connected to the sensing resistor 22, such that the first input is connected upstream and the second input downstream of the sensing resistor. The direction of flow of current in the first conductor is from left to right in the drawings.

The limiting resistor 40 of the switching means 20 is connected, in series, intermediate the output 30 of the differential amplifier 24 and the base terminal 34 of the transistor 32. The collector terminal 36, of the transistor, is connected to the terminating circuit 21. The terminating circuit is also connected to the first conductor 12a upstream of the sensing resistor 22.

The emitter terminal 38, of the transistor, is connected to the second conductor 12b.

The current flowing in the first conductor 12a is detected by sensing the voltage drop across the sensing resistor 22. The voltage drop is maintained at a minimum value by selecting a relatively low value for the sensing resistor. The voltage drop across the sensing resistor 22 is measured by the differential amplifier 24.

Upon detecting current flowing through the sensing resistor 22 greater than a first predetermined threshold the input differential of the differential amplifier is significant and the output 30 is driven low relative to the voltage at the collector terminal 36. Therefore, the switching means 20 will remain open and the circuit 10 will be maintained as a continuing circuit. However, upon detecting current flowing at, or less than, a second predetermined threshold the differential will be high and the output 30 will be high relative to the voltage at the emitter terminal 36. Therefore, switching means will switch to connect the terminating circuit 21 and the second conductor 12b and the network will be terminated such that the integrity of signals being transmitted on the network are maintained.

The first and second threshold may be the same to define a switching threshold, such as, for example, 0 Volts. Alternatively, the first and second thresholds may be different such that, for example, the switching means maintains a continuing circuit if a voltage greater than 3 Volts is detected and switches to the terminating circuit if a voltage of 3 Volts, or less, such as, 0 Volts is detected. However, it will be appreciated that thresholds defining different voltages are equally applicable to the invention.

FIG. 2 is a first embodiment a network 14 comprising a plurality of nodes 161 to 16N connected, from a host 17, by the first and second conductors 12a and b. Each node 16 comprises a respective electronic circuit 101 to 10N disposed therein.

Upon a fault occurring at node 16N+1 the current flowing through the first conductor 12a to that node will stop, or at least reduce. Such a fault causes a mis-match of the impedance of the network as a whole and therefore the integrity of the signals transmitted will not be maintained even in respect of nodes in which there is no fault. On detection of the reduction of current flowing from node 16N to 16N+1 the electronic circuit 10N, disposed in node 16N, switches it from being a continuing circuit to being a terminating circuit whereby the impedance of the network is matched by appropriate termination thereby maintaining the integrity of the signals transmitted.

In FIG. 3 a second embodiment of a network 114 comprises a plurality of nodes, 116a to e, connected intermediate a first host 117a and a second host 117b by a first pair of transmission lines 112 and a second pair of transmission lines 113. Each node comprises a respective electronic circuit 110a to e disposed therein. The first and second hosts 117a and b comprise first and second power supplies 118a and b, respectively.

In use, the first power supply 118a provides a current flowing through the first transmission lines 112 in a clockwise direction, whilst the second power supply 118b provides a current flowing through the transmission lines 113 in an opposite, anticlockwise, direction.

Upon a fault occurring, for example, at point X on transmission lines 112 and 113 (i.e. between nodes 116b and c) current flowing from the first power supply 118a along the first transmission lines 112 will cease to flow, or will reduce, to node 116c. Similarly, current flowing from the second power supply 118b along the second transmission lines 113 will cease to flow, or will reduce, to node 116b. Such a fault causes a mis-match of the impedance of the network as a whole and therefore the integrity of the signals transmitted will not be maintained even in respect of nodes in which there is no fault.

On detection of the reduction of current flowing clockwise from node 116b to 116c, electronic circuit 110b, disposed in node 116b, switches from being a continuing circuit to being a terminating circuit whereby the impedance of the network is matched by appropriate termination thereby maintaining the integrity of the signals transmitted in relation to nodes 116a and 116b.

Similarly, on detection of the reduction of current flowing anticlockwise from node 116c to 116b, electronic circuit 110c, disposed in node 116c, switches from being a continuing circuit to being a terminating circuit whereby the impedance is matched by appropriate termination thereby maintaining the integrity of the signals transmitted in relation to nodes 116c, 116d and 116e.

Although network 114 has five nodes 116a to e, it will be appreciated that the invention is equally applicable to any plurality of nodes. Furthermore, it will be also be appreciated that the nodes may have any arrangement in the network and that the clockwise/anticlockwise arrangement of the network shown in FIG. 3 is merely to facilitate description of the invention and in no way limiting to a specific arrangement.

Figure 4:
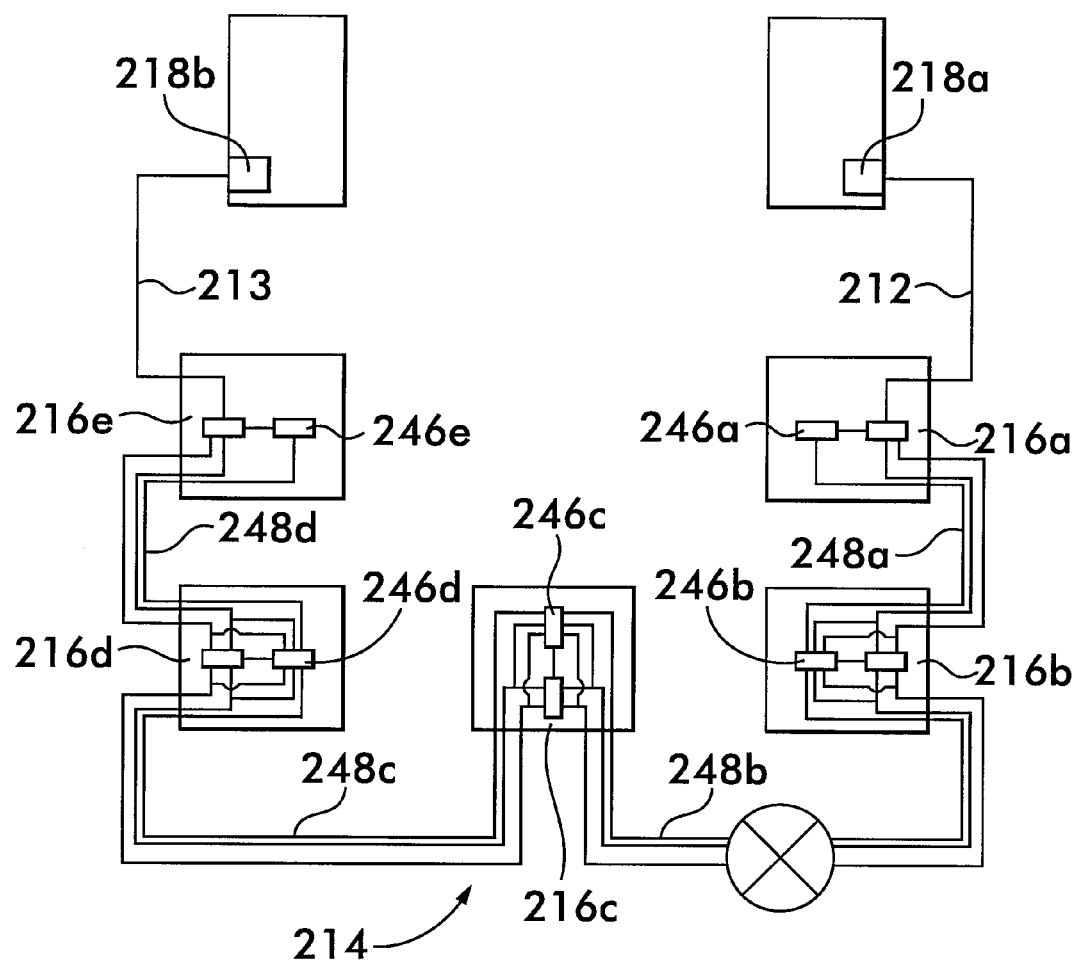

In FIG. 4 a third embodiment of a network 214 is similar to the network 114 of the second embodiment, but further comprises checking means operable, upon detection of a fault, to check the status of the transmission lines 212 and 213 between two adjacent nodes. The checking means comprises checking circuits, 246a to e, disposed in nodes, 216a to e, respectively. The checking circuits are advantageously logic circuits. Each checking circuit, 246a to e, is connected to an adjacent checking circuit by way of a checking transmission line 248a to d, such that logic circuits 246a and b are connected by checking transmission line 248a, logic circuits 246b and c are connected by checking transmission line 248b, logic circuits 246c and d are connected by checking transmission line 248c and logic circuits 246d and e are connected by checking transmission line 248d. The checking transmission line 248 follows the same path as the first and second transmission lines, 212 and 213, and may be bundled therewith, such that a break in the first and/or second transmission lines will result in a break in the checking transmission line 248.

Because each of the electronic circuits 110a to e detect the occurrence of a fault by sensing the current flowing through a respective node 216a to e, it is possible that, in having first and second power supplies, 218a and b, providing current flow in opposite directions, one of the electronic circuits 110a to e may detect zero current, or current below a predetermined threshold, even if there is no real fault on the transmission lines, due to the sum of the currents totaling zero or below the predetermined threshold.

Upon detection of zero current, or current below the predetermined threshold, for example in node 216c by electronic circuit 110c, checking circuit 246c transmits a checking signal to checking circuits 246b and 246d, disposed in adjacent nodes 216b and 216d, respectively, by way of the checking transmission line 248.

Upon receipt of a checking signal, receiving checking circuits, 246b and d, respond with a return signal. Receipt of the return signal by the initiating checking circuit is indicative that there is no fault on the transmission lines. In which case, the electronic circuit 110c remains a continuing circuit.

However, if the initiating checking circuit 246c does not receive a return signal from either one of the receiving checking circuits, 246b and d, it instructs the electronic circuit 110c to switch to connect the terminating circuit and the network will be terminated such that the integrity of signals transmitted on the network are maintained. Therefore, in the example, if there is a fault at X, the initiating checking circuit 246c would not receive a response from the receiving checking circuit 246b.

The invention claimed is:

1. An electronic circuit, capable of terminating a plurality of conductors at, or near, a node on a network, comprising detecting means, operable to detect current in at least one of the plurality of conductors, said detecting means comprising a sensing resistor connected in series with at least one of the plurality of conductors, switching means comprising a transistor, said switching means being operable to switch the circuit between being a continuing circuit, upon the detecting means detecting current greater than a first predetermined threshold, and being a terminating circuit, upon the detecting means detecting current at, or less than, a second predetermined threshold, means for detecting voltage across the sensing resistor, and impedance matching means, wherein said impedance matching means is connected to said at least one conductor and a second conductor by way of said transistor.

2. An electronic circuit as claimed in claim 1, wherein the impedance matching means comprises a terminating resistor connected in series with a terminating capacitor.

3. An electronic circuit as claimed in claim 1, wherein the first threshold is the same as the second threshold.

4. An electronic circuit as claimed in claim 1, wherein the means for detecting voltage is a differential amplifier.

5. An electronic circuit as claimed in claim 1, wherein the transistor comprises a base terminal connected to an output of the detecting means.

6. An electronic circuit as claimed in claim 1, wherein the transistor comprises an emitter terminal, connected to the impedance matching means, and a collector terminal connected to the, or each, other conductors.

7. A node comprising an electronic circuit as claimed in claim 1.

8. A node as claimed in claim 7, further comprising checking means operable, upon the detecting means detecting current at, or less than, the second predetermined threshold, to check the status of the conductors connected to an adjacent node.

9. A network comprising at least one electronic circuit as claimed in claim 1.

10. A network as claimed in claim 9, comprising a plurality of power supplies operable to provide current flowing in opposing directions through the network.

* * * * *

UNITED STATES PATENT AND TRADEMARK OFFICE
CERTIFICATE OF CORRECTION

| | | |
|---|---|---|
| PATENT NO. | : 7,355,438 B2 | Page 1 of 1 |
| APPLICATION NO. | : 10/573447 | |
| DATED | : April 8, 2008 | |
| INVENTOR(S) | : El Sayed | |

It is certified that error appears in the above-identified patent and that said Letters Patent is hereby corrected as shown below:

Column 6, line 31, insert --of the-- before "other conductors."

Signed and Sealed this

Eighth Day of July, 2008

JON W. DUDAS
*Director of the United States Patent and Trademark Office*